US010560014B2

(12) United States Patent
Chivite-Zabalza et al.

(10) Patent No.: US 10,560,014 B2
(45) Date of Patent: Feb. 11, 2020

(54) FAULT PROTECTION FOR VOLTAGE SOURCE CONVERTERS

(71) Applicant: General Electric Technology GmbH, Baden (CH)

(72) Inventors: Javier Francisco Chivite-Zabalza, Stafford (GB); David Reginald Trainer, Derby (GB); Jonathan Christopher Nicholls, Stafford (GB); Konstantin Vershinin, Stafford (GB); Ikenna Bruce Efika, Croydon (GB); Francisco Jose Moreno Munoz, Navarra (ES); John Lewis Outram, Stafford (GB); Rajaseker Reddy Ginnareddy, Stafford (GB)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 16/081,440

(22) PCT Filed: Mar. 1, 2017

(86) PCT No.: PCT/EP2017/054711
§ 371 (c)(1),
(2) Date: Aug. 31, 2018

(87) PCT Pub. No.: WO2017/148980
PCT Pub. Date: Sep. 8, 2017

(65) Prior Publication Data
US 2019/0028021 A1 Jan. 24, 2019

(30) Foreign Application Priority Data
Mar. 3, 2016 (GB) .................... 1603733.5

(51) Int. Cl.
*H02M 1/32* (2007.01)
*H02M 1/34* (2007.01)
(Continued)

(52) U.S. Cl.
CPC ................. *H02M 1/34* (2013.01); *H02J 3/36* (2013.01); *H02J 7/345* (2013.01); *H02M 1/32* (2013.01);
(Continued)

(58) Field of Classification Search
CPC ... H02M 2001/007; H02M 2001/0074; H02M 1/32; H02M 1/36; H02M 7/48;
(Continued)

(56) References Cited

U.S. PATENT DOCUMENTS 8,848,407 B2 * 9/2014 Blomberg ............... H02M 1/32
323/207
9,680,304 B2 * 6/2017 Adest .................. H02M 3/1582
(Continued)

FOREIGN PATENT DOCUMENTS

EP 2961057 A1 12/2015
EP 3001552 A1 3/2016
WO WO-2015082698 A1 * 6/2015 .............. H02M 1/32

OTHER PUBLICATIONS

Great Britain Search Report and Written Opinion dated Aug. 16, 2016 which was issued in connection with GB patent No. GB1603733.5 which was filed on Mar. 3, 2016.
(Continued)

*Primary Examiner* — Yusef A Ahmed
*Assistant Examiner* — Shahzeb K Ahmad
(74) *Attorney, Agent, or Firm* — Eversheds Sutherland (US) LLP

(57) ABSTRACT

Fault protection of a voltage source converter is provided. An apparatus has a chain-link circuit in series with a director
(Continued)

switch. The chain-link circuit includes cells including an energy storage element and cell switching elements connected with anti-parallel diodes. Each cell switching element has a cell switching element controller. The director switch includes director switch units, each having a director switching element and a director switch unit controller. Each cell switching element controller monitors for a fault current and turns-off its associated cell switching element and reports a fault event to a fault controller. Each director switch unit controller monitors for a fault current and reports a fault event to the fault controller but the director switch unit control keeps its associated director switching element turned-on. The fault controller monitors for reports of fault events to order the cell switching elements of at least some of the cells to turn-off.

15 Claims, 6 Drawing Sheets

(51) Int. Cl.
  *H02J 3/36* (2006.01)
  *H02J 7/34* (2006.01)
  *H02M 7/797* (2006.01)
  *H02M 7/49* (2007.01)
  *H02M 7/483* (2007.01)

(52) U.S. Cl.
  CPC .............. *H02M 7/797* (2013.01); *H02M 7/49* (2013.01); *H02M 2001/325* (2013.01); *H02M 2001/348* (2013.01); *H02M 2007/4835* (2013.01); *Y02E 60/60* (2013.01)

(58) Field of Classification Search
  CPC ................. H02M 7/483; H02M 7/487; H02M 2007/4835; H02M 7/49; H02M 2001/325; H02H 7/10
  See application file for complete search history.

(56) References Cited

U.S. PATENT DOCUMENTS

| 2008/0174182 | A1 | 7/2008 | Hammond | |
|---|---|---|---|---|
| 2014/0002933 | A1* | 1/2014 | Gao | H02M 1/32 361/18 |
| 2014/0043878 | A1 | 2/2014 | Blomberg | |
| 2014/0097804 | A1 | 4/2014 | Hasler | |
| 2016/0172991 | A1* | 6/2016 | Steimer | H02M 5/293 363/35 |
| 2016/0190924 | A1* | 6/2016 | Koyanagi | H02M 7/483 323/271 |
| 2018/0076734 | A1* | 3/2018 | Jimichi | H02M 1/32 |
| 2018/0183231 | A1* | 6/2018 | Xie | H02H 7/1203 |
| 2018/0212533 | A1* | 7/2018 | Nami | H02M 1/32 |

OTHER PUBLICATIONS

International Application Search Report and Written Opinion dated Jun. 21, 2017 which was issued in connection with WO PCT/EP2017/054711 which was filed on Mar. 1, 2017.

Jared Candelaria et. al.: "VSC-H"VDC system protection: A review of current methods", Power Systems conference and Exposition (PSCE), 2011 IEEE/PES, IEEE, Mar. 20, 2011, pp. 1-7.

Feldman Ralph et. al.: "DC fault ride-through capability and STATCOM operation of a HVDC hybrid voltage source converter", IET Generation, Transmission & Distribu, IET, UK vol. 8, No. 1, Jan. 1. 21014, pp. 114-120 XP00604705.

* cited by examiner

FAULT PROTECTION FOR VOLTAGE SOURCE CONVERTERS

FIELD OF INVENTION

This application relates to methods and apparatus for fault protection for voltage source converters, and especially for voltage source converters for use in high voltage power distribution and in particular, to voltage source converters having chain-links for wave-shaping and director switches.

BACKGROUND OF THE INVENTION

HVDC (high-voltage direct current) electrical power transmission uses direct current for the transmission of electrical power. This is an alternative to alternating current electrical power transmission which is more common. There are a number of benefits to using HVDC electrical power transmission.

In order to use HVDC electrical power transmission, it is typically necessary to convert alternating current (AC) to direct current (DC) and back again. To date most HVDC transmission systems have been based on line commutated converters (LCCs), for example, such as a six-pulse bridge converter using thyristor valves. LCCs use elements such as thyristors that can be turned on by appropriate trigger signals and remain conducting as long as they are forward biased. In LCCs the converter relies on the connected AC voltage to provide commutation from one valve to another.

Increasingly however, voltage source converters (VSCs) are being proposed for use in HVDC transmission. HVDCs use switching elements such as insulated-gate bipolar transistors (IGBTs) that can be controllably turned on and turned off independently of any connected AC system. VSCs are thus sometimes referred to as self-commutating converters.

VSCs typically comprise multiple converter arms, each of which connects one DC terminal to one AC terminal. For a typical three phase AC input/output there are six converter arms, with the two arms connecting a given AC terminal to the high and low DC terminals respectively forming a phase limb. Each converter arm comprises an apparatus which is commonly termed a valve and which typically comprises a plurality of elements which may be switched in a desired sequence.

In one form of known VSC, often referred to as a six pulse bridge, each valve comprises a set of series connected switching elements, typically insulated gate bipolar transistors (IGBTs) connected with respective antiparallel diodes. The IGBTs of the valve are switched together to electrically connect or disconnect the relevant AC and DC terminals, with the valves of a given phase limb typically being switched in anti-phase. By using a pulse width modulated (PWM) type switching scheme for each arm, conversion between AC and DC voltage can be achieved.

In another known type of VSC, referred to a modular multilevel converter (MMC), each valve comprises a chain-link circuit having a plurality of cells connected in series, each cell comprising an energy storage element such as a capacitor and a switch arrangement that can be controlled so as to either connect the energy storage element between the terminals of the cell or bypass the energy storage element. The cells are sometimes referred to as sub-modules, with a plurality of cells forming a module. The sub-modules of a valve are controlled to connect or bypass their respective energy storage elements at different times so as to vary over the time the voltage difference across the plurality of cells. By using a relatively large number of sub-modules and timing the switching appropriately the valve can synthesise a stepped waveform that approximates to a desired waveform, such as a sine wave, to convert from DC to AC or vice versa with low levels of harmonic distortion. As the various sub-modules are switched individually and the changes in voltage from switching an individual sub-module are relatively small, a number of the problems associated with the six pulse bridge converter are avoided.

In the MMC design each valve is operated continually through the AC cycle with the two valves of a phase limb being switched in synchronism to provide the desired voltage waveform.

Recently a variant converter has been proposed wherein a chain-link of a series of connected cells is provided in a converter arm for voltage wave-shaping, e.g. providing a stepped voltage waveform as described, but each converter arm is turned off for at least part of the AC cycle. Thus the plurality of series connected cells for voltage wave-shaping are connected in series with an arm switch, referred to as a director switch, which can be turned off when the relevant converter arm is in the off state and not conducting. Such a converter has been referred to as an Alternate-Arm-Converter (AAC). An example of such a converter is described in WO2010/149200.

FIG. 1 illustrates a known Alternate-Arm-Converter (AAC) 100. The example converter 100 has three phase limbs 101a-c, each phase limb having a high side converter arm connecting the relevant AC terminal 102a-c to the high side DC terminal DC+ and a low side converter arm connecting the relevant AC terminal 102a-c to the low side DC terminal DC−. Each converter arm comprises a circuit arrangement 103 of series connected cells, the arrangement 103 being in series with an arm switch 104 and inductances 105. It will be noted that FIG. 1 illustrates a single arm inductance but one skilled in the art will appreciate that the arm inductance may in practice be distributed along the arm between the AC and DC terminals.

The circuit arrangement 103 comprises a plurality of cells 106 connected in series. Each cell 106 has an energy storage element that can be selectively connected in series between the terminals of the cell or bypassed. In the example shown in FIG. 1 each cell 106 has terminals 107a, 107b for high-side and low-side connections respectively and comprises a capacitor 108 as an energy storage element. The capacitor 108 is connected with cell switching elements 109, e.g. IGBTs with antiparallel diodes, to allow the terminals 107a and 107b of the cell to be connected via a path that bypasses capacitor 108 or via a path that includes capacitor 108 connected in series. In the example illustrated in FIG. 1 each cell comprises four cell switching elements 109 in a full H-bridge arrangement such that the capacitor can be connected in use to provide either a positive or a negative voltage difference between the terminals 107a and 107b. The circuit arrangement 103 of such series connected cells can thus operate to provide a voltage level that can be varied over time to provide stepped voltage waveform for wave-shaping as discussed above. The circuit arrangement 103 is sometimes referred to as a chain-link circuit or chain-link converter or simply as a chain-link. In this disclosure the circuit arrangement 103 of such series connected cell for providing a controlled voltage shall be referred to as a chain-link.

In the AAC converter the chain-link 103 in each converter arm is connected in series with an arm switch 104, which will be referred to herein as a director switch, which may comprise a plurality of series connected arm switching elements 110. The director switch of a converter arm may for example comprise high voltage elements with turn-off capability such as IGBTs or the like connected with antiparallel diodes.

When a particular converter arm is conducting, the chain-link 103 is switched in sequence to provide a desired waveform in a similar fashion as described above with respect to the MMC type converter. However, in the AAC converter, each of the converter arms of a phase limb is switched off for part of the AC cycle and during such a period the director switch 104 is turned off.

When the converter arm is thus in an off state and not conducting the voltage across the arm is shared between the director switch and the chain-link circuit. Compared to the MMC type VSC the required voltage range for the chain-link of each converter arm of an AAC type converter is thus reduced, with consequent savings in the cost and size of the converter.

In an HVDC VSC installation one problem that may occur is a flash-over across insulators forming part of a converter system, e.g. across insulators inside the valve-hall. Such events cause a short circuit between parts of the circuit which can result in high-level fault currents that, if not dealt with properly, are likely to destroy the semiconductor switching elements and/or their auxiliary circuitry. Such events can result in significant damage requiring significant repairs with a long and costly down-time.

BRIEF DESCRIPTION

The present disclosure thus relates to methods and apparatus for fault protection for voltage source converters, and especially to VSCs having a mixture of chain-link cells and series connected director switch elements.

Thus, according to the present invention, there is provided an apparatus for a voltage source converter comprising a chain-link circuit in series with a director switch and a fault controller. The chain-link circuit comprises a plurality of cells, each cell comprising an energy storage element and a plurality of cell switching elements connected with antiparallel diodes, the cell switching elements being configured such that the energy storage element can be selectively connected in series between terminals of the cell or bypassed. Each cell switching element has an associated cell switching element controller. The director switch comprises a plurality of director switch units, each director switch unit comprising a director switching element and a director switch unit controller. Each cell switching element controller is configured to monitor for a fault current and, in the event a fault current is detected, to turn-off its associated cell switching element and report a fault event to the fault controller. Each director switch unit controller is configured to monitor for a fault current and, in the event a fault current is detected, to report a fault event to the fault controller and to keep its associated director switching element turned-on. The fault controller is configured to monitor for any reports of fault events to determine whether a fault is occurring and, in the event that a fault is occurring, to order all of the cell switching elements of at least some of the plurality of cells to turn-off.

In embodiments of the present invention there is thus monitoring for a fault current at each switching element. However, the response to a fault current is different for the switching elements of the director switch and the switching elements of the cells of the chain-link. If a fault is detected at a director switching element, by the local controller, the fault detection is reported to the fault controller which is a higher level controller and the director switching element is kept turned on. If however, a fault is detected at a switching element of a cell of the chain-link, then a fault report is also communicated to the fault controller but the cell switching element is turned off. As will be explained in more detail later this has the effect of mitigating fault currents and avoiding overvoltage on a switching element. The fault controller, in response to the fault reports, orders at least some and possibly all of the cells of the chain-link to a blocked state with all switching elements of the cell turned off. In this way the energy storage elements of the chain-link cells help reduce and manage the fault current.

In some embodiments each cell switching element controller is configured, in the event a fault current being detected, to turn-off all of the cell switching elements of that cell, i.e. without waiting for an order from the fault controller.

The fault controller may be configured to determine that a fault is occurring if a predetermined number of fault reports are received within a predefined time window of a first fault report.

In some embodiments the fault controller is configured to determine a location where the fault is occurring and determine which cells to turn off based on said identified location.

In some embodiments the fault controller may be configured to, after ordering all of the cell switching elements of at least some of the plurality of cells to turn-off, subsequently order the director switch units to turn-off. In some embodiments the subsequent turn off of the director switch units may occur when a safe current level is reached. In some instances all of the directors switch units may be ordered to be turned off simultaneously, this may be the case for instance, if it is desired to turn the director switch off while a relatively significant current is still flowing, e.g. due to some other fault detection. In some instances the director switch units may be arranged in groups with a local group controller and the director switch units of a group may be turned off together.

At least one director switch unit controller may be configured, in the event of detection of a fault current, to modulate the drive voltage applied to the associated switching element. The modulation of the drive voltage may comprise either reducing the gate drive voltage or increasing the gate drive voltage.

Embodiments also relate to a voltage source converter (VSC) having at least one phase limb having two converter arms, each converter arm having an apparatus as described in any of the variants above. The VSC may be an AAC type VSC although embodiments encompass any type of VSC with a mix of cells for wave-shaping and director switch elements.

Aspects also relate to a method of fault protection for a voltage source converter comprising a chain-link circuit in series with a director switch; wherein the chain-link circuit comprises a plurality of cells, each cell comprising an energy storage element and a plurality of cell switching elements connected with antiparallel diodes, the cell switching elements being configured such that the energy storage element can be selectively connected in series between terminals of the cell or bypassed; and the director switch comprises a plurality of director switch units, each director switch unit comprising a director switching element. The method comprises monitoring at each cell switching element for a fault current and, in the event a fault current is detected at a cell switching element, turning-off that cell switching element and reporting a fault event to a fault controller;

monitoring at each director switching element for a fault current and, in the event a fault current is detected, reporting a fault event to the fault controller and keeping that director switching element turned-on; and monitoring at the fault controller for any reports of fault events to determine whether a fault is occurring and, in the event that a fault is occurring, ordering all of the cell switching elements of at least some of the plurality of cells to turn-off.

The method may be implemented in any of the variants described above with respect to the first aspect of the invention.

BRIEF DESCRIPTION OF THE DRAWINGS

The invention will now be described by way of example only with reference to the following drawings, of which.

DETAILED DESCRIPTION

As noted above, during the working life of a voltage source converter (VSC), it is perhaps quite likely that the VSC will be subject to flash-over situations across insulators inside the valve-hall with the result of short-circuiting parts of the VSC circuit. Such events will typically cause high-level fault currents that, if not deal with properly, are likely to destroy semiconductor components of the VSC and their auxiliary circuitry, causing a significant repair damage and a long and costly down-time. It will be appreciated however, that whilst flash-over may be a possibly likely fault condition, there may also be other fault conditions that may lead to relatively high fault currents.

In a converter such as the Alternate Arm Converter (AAC) that comprises a mixture of chain-link cells and also series connected semiconductor switching elements, e.g. forming a director switch, it has been recognised that it is advisable to take a coordinated action to any such fault. In conventional VSC installations each of the semiconductor switching elements, e.g. IGBTs, is normally provided with a short-circuit protection system at the local gate-driver circuit level which is configured to rapidly turn-off the relevant switching element when a short-circuit current level is detected, independent of what other devices in the same converter arm may be doing. This protection acts when the IGBT device is turned-on and in conduction, but it does not operate if the corresponding freewheeling diode is conducting. The short-circuit level may be first detected in any of the director switch IGBTs or in any of the chain-link IGBTs and the protection response would be the same in each instance.

Figure 1:
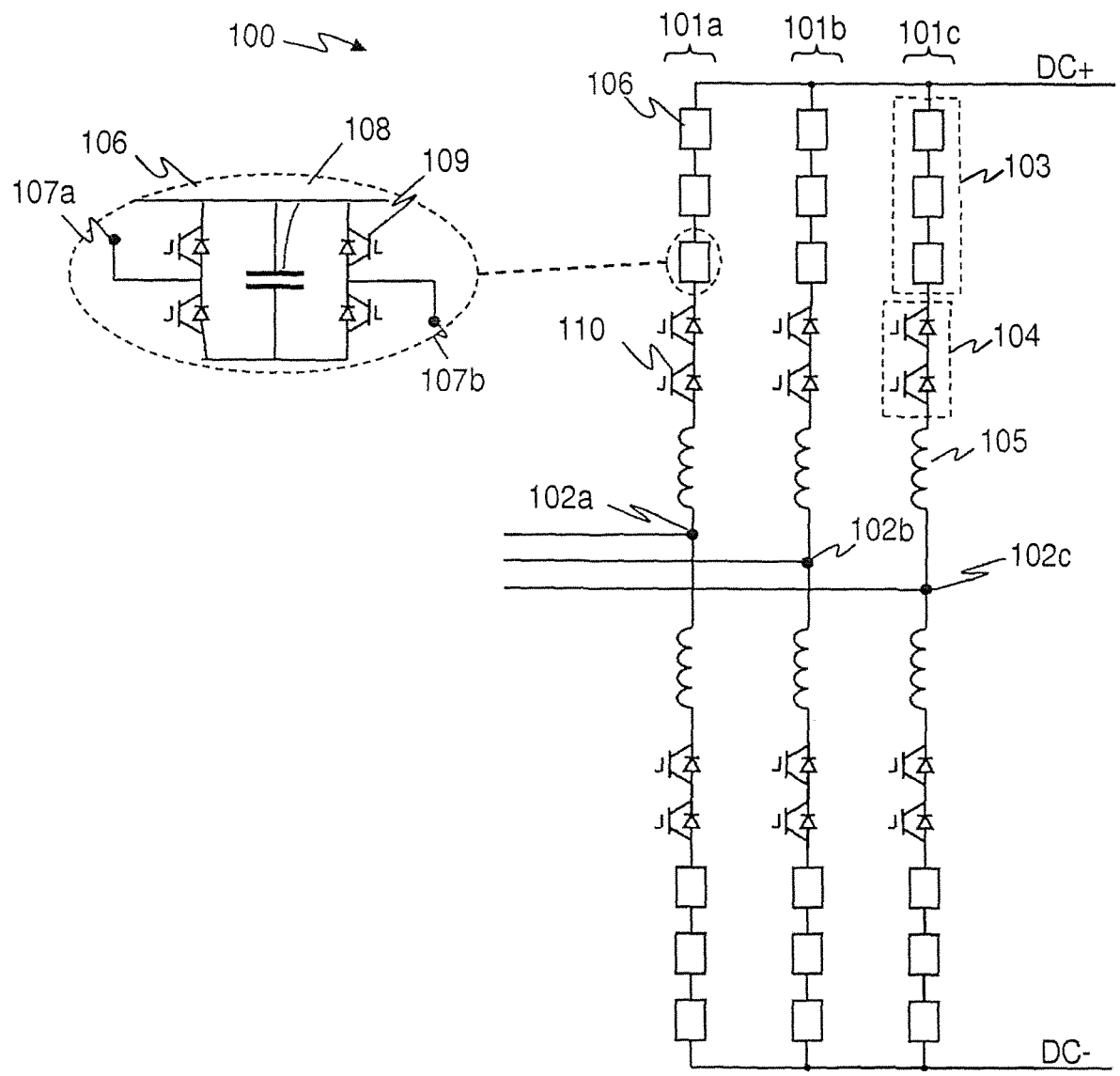
FIG. 1 illustrates one example of an Alternate-Arm-Converter (AAC) type voltage source converter (VSC)
Figure 2:
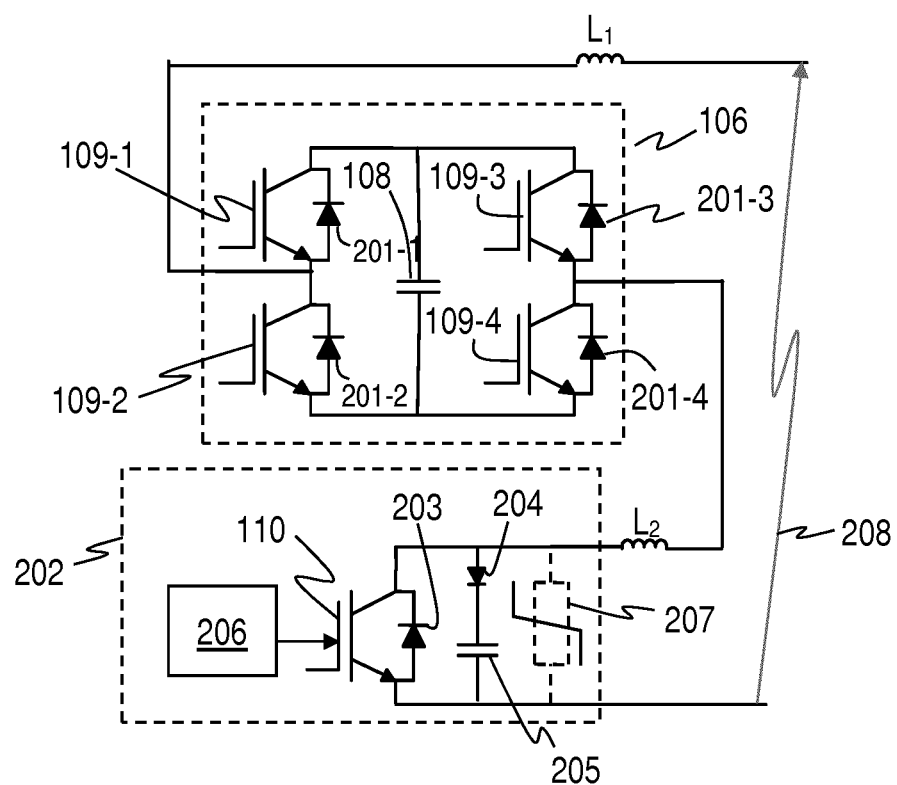
FIG. 2 illustrates the principles of a flash-over for an AAC type converter.

FIG. 2 illustrates the principle of a flash-over in a converter arm of an AAC type VSC with chain-link cells for voltage wave-shaping and also switching elements forming a director switch. FIG. 2 illustrates a single cell 106 of a chain-link as an aggregate for all the cells of the chain link. The cell 106 has a capacitor 108 and four semiconductor switching elements 109-1 to 109-4 in a full H-bridge arrangement, each with an antiparallel diode 201-1-201-4. The cell 106 is connected in series with a director switch unit 202, i.e. a semiconductor switching element such as an IGBT 110 forming part of a director switch and its antiparallel diode 203 and associated circuitry. The associated circuitry may comprise a snubber circuit comprising a snubber diode 204 and snubber capacitor 205 and gate drive electronics 206. In some instances there may be a surge arrestor 207 connected across the semiconductor switching element 110. FIG. 2 illustrates a single director switch unit 202 as an aggregate for all the series connected units forming the director switch.

FIG. 2 illustrates a flash-over condition 208 appearing across the positive DC terminal and the positive converter output terminal of one arm, at the point of connection of the arm inductors. This means that in this example the arm inductors are not there to mitigate the fault current level, only some small stray inductance terms $L_1$ and $L_2$, that represent the parasitic inductance of the DC and arm busbars respectively, are present. Assuming that the voltage across this part of the converter arm is positive the fault current will flow via the semiconductor switching element 110 of the director switch unit(s).

It will of course be appreciated that FIG. 2 illustrates just one example of a fault for a VSC for explanation. As noted above, there may be other types of fault and/or a flash-over fault could be a partial flash-over or indeed any type of flash-over. Different converter designs may include different elements, for instance some converter designs may not include any significant arm inductors. The general principles of this disclosure apply to a range of VSC designs and fault types.

For this example it is assumed that the protection system for the IGBT 110 of the director switch unit detects the short-circuit level first, and thus acts to turn IGBT 110 off. Thus the fault current path, which would have been flowing via the IGBT 110, now shifts to flow via snubber diode 204 and snubber capacitor 205. The snubber capacitor typically has a comparatively low capacitance value and thus the snubber capacitor is charged up very quickly.

If there is a surge arrestor or surge protection device (SPD) 207 across the director switching element 110, the voltage of snubber capacitor 205 will rapidly reach the trigger or protective voltage level of the SPD, leaving it to absorb the energy contained in the large submodule cell capacitor 108 until the control system takes any action. However the amount of energy that the SPD would be required to absorb in this scenario would be very large, which would require some specialised device with a capability beyond any presently commercially viable and available device (and thus likely to be cost prohibitive).

If no SPD were connected across the director switch element 110 then the voltage of clamp snubber capacitor 205 would increase and rapidly reach the maximum level that can be withstood by the director switch IGBT 110. This high voltage across the IGBT 100 would thus result in its destruction.

Figure 3:
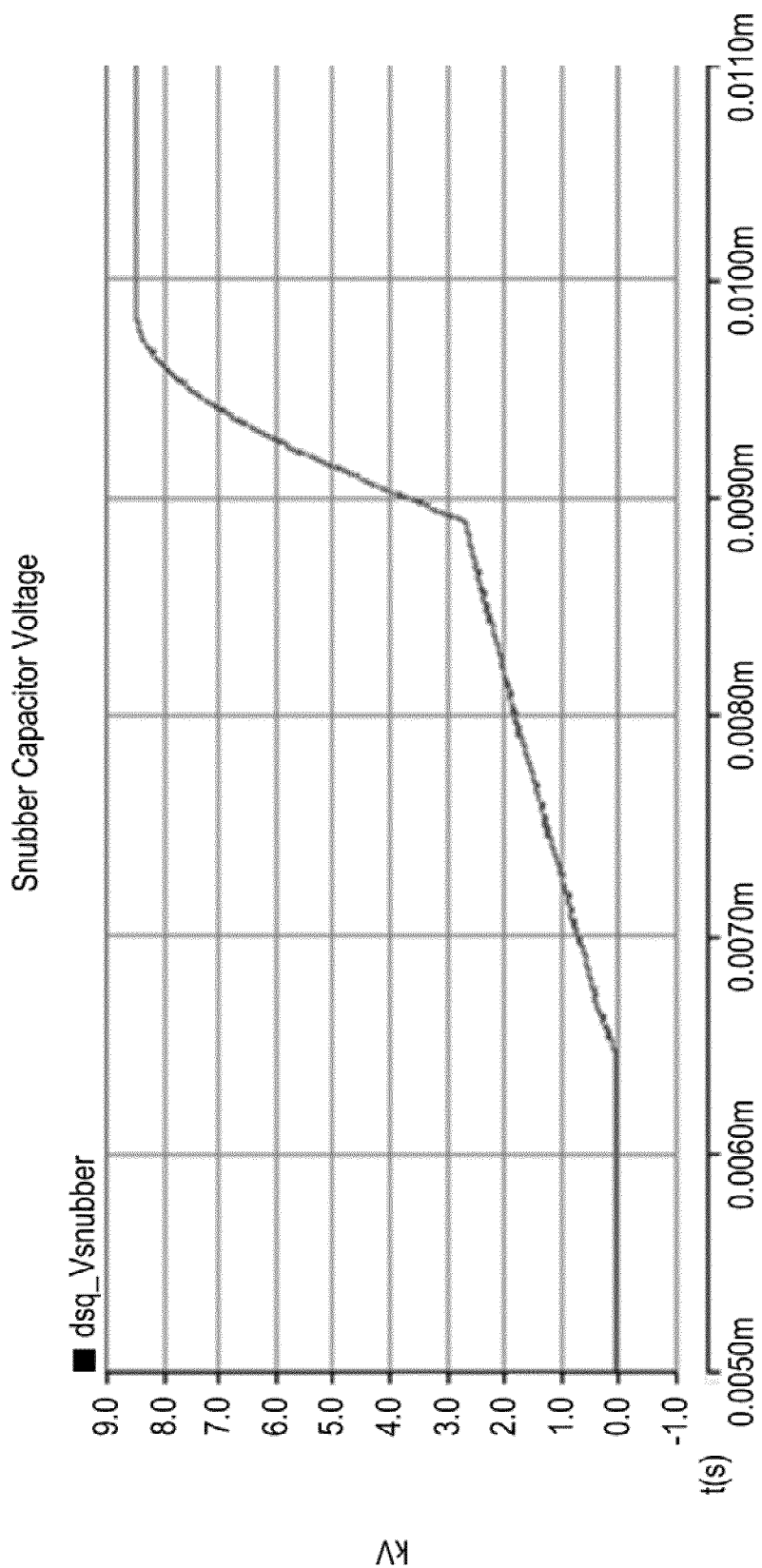
FIG. 3 illustrates how voltage of a snubber capacitor may vary during a flash-over event.

FIG. 3 illustrates a simulated waveform showing how the voltage across the snubber capacitor 205, which would be the same as the voltage across the IGBT 110, would vary in such a fault scenario without a suitable SPD 207—FIG. 3 shows the voltage change across the snubber capacitor. The voltage across the clamp capacitor rapidly rises to a level which is more than double the breakdown voltage of IGBT. To mitigate this situation any SPD 207 connected across the IGBT in the director switch unit would, in this example, have to be rated for around 30 kJ and 10 kA. Moreover, it would be likely that in practice one or more of the semiconductor switching elements, i.e. IGBTs, of the director switch of a converter arm will open, i.e. turn-off, before the others, thus taking an even higher share of the voltage. In this case the rating required for a suitable SPD may increase by a factor of ten or more. In simulations of a full converter arm with 30% of the IGBTs of the director switch modelled as reacting to the flashover fault (with the rest remaining conducting) it was found that the energy required to be dissipated by an SPD was of the order of 280 kJ in 10 μs, which is not presently practical.

Embodiments of the present invention thus involve a coordinated approach to flashover faults that mitigates some of these issues. In a method according to one embodiment a local controller of a director switch unit is configured to report detection of a fault to a higher-level fault controller but to keep the associated director switching element turned-on and conducting. A local controller for a semiconductor switching element of a cell of the chain-link is however configured to react instantaneously to a fault detection to turn that switching element off, as well as sending a fault report. The overall system will aim to relatively quickly turn-off all IGBTs forming part of the chain-link cells.

In the event of such a fault, the method thus aims to turn-off all the semiconductor switching elements of the chain-link cells whilst, initially at least, maintaining the switching elements of the director switch to be turned on and conducting. The method may thus turn-off all the semiconductor switching elements of the chain-link cells before any of the semiconductor switching elements of the director switch are turned off.

Figure 4:
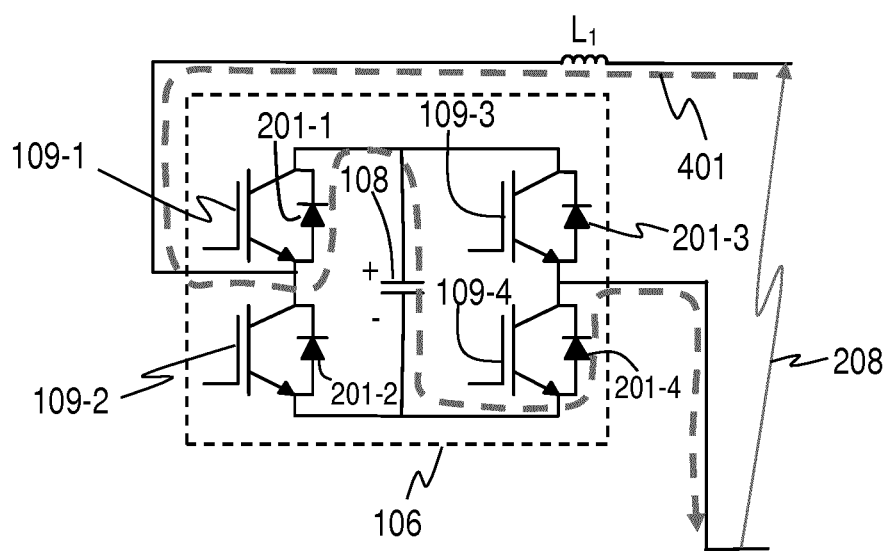
FIG. 4 illustrates the fault current path when the chain link cells are in a blocked state.

By turning off all the switching elements 109-1 to 109-4 of the chain-link cell 106 the fault current, which may have been carried by IGBTs 109-2 and 109-3, instead flows via the freewheeling diodes 201-1 and 201-4. This current path, illustrated as path 401 in FIG. 4, includes the relatively large capacitor 108 of the chain-link cell connected in a way to oppose the short circuit current. Operating the cells of the chain-link in this way thus mitigates and limits the fault current and helps preserve the integrity of all the semiconductor devices of the VSC.

In some embodiments, the semiconductor switching elements of the director switch may then be turned off simultaneously once the fault current has been sufficiently extinguished. The higher-level fault controller may thus order the director switch to open, i.e. the switching elements of the director switch units to turn-off, when it is safe to do so—but the local protection control for the director switch units will not operate independently to turn their individual semiconductor switches off.

The director switch unit controller is thus configured to effectively report detection of high current indicative of a fault to a fault controller, but not independently act on the fault detection and thus to keep the switching element turned on. By contrast the local protection system for the switching elements, e.g. IGBTs, forming part of the chain-link cells will react instantaneously to detection of a fault and act to turn off the switching element. The local controller will also aim to turn-off all switching elements forming part of that chain-link cell. Detection of the fault will also be reported to the fault controller which, as noted, forms at least part of a higher-level controller for the converter arm of the VSC.

In any case, when the fault controller determines there is a flashover type fault, based on receiving fault reports from one or more local controller protection systems, it acts to order at least some the cells of the chain-link to turn-off all the switching elements of those cells.

The fault controller may determine a fault in various ways. In some instances the fault controller may act on each and every fault report it receives. In some embodiments however, the number and/or timing of the fault reports received at the fault controller may be assessed against some defined characteristic in order to identify a fault. For instance, in some embodiments, the fault controller may be configured not to react to a single fault report from a director switch unit or a chain-link cell but to require a certain threshold number of fault notifications to be received within a certain time window of the first such notification order to declare a fault.

The fault controller may generate suitable control signals to order all of the cells of the chain-link to switch to a blocked state with all switching elements off. In some embodiments however, the fault controller may be operable such that if the fault signals are associated with only part of the VSC circuit then only those cells relevant for that part of the circuit are blocked. In this case the control system should be configured to operate relatively quickly.

As noted above, once the cells of the chain-link circuit have switched to the blocked state and after the fault currents have been sufficiently extinguished, the fault controller may order the director switch to open, i.e. generate control signals to turn-off the switching elements of the director switch units. As noted the semiconductor switching elements, e.g. IGBTs, of the director switch IGBTs may be configured so as to not open independently and instead always follow the command from the fault controller (or other high-level controller in non-faulted operation).

It is possible that any flashover event, once brought under control, may not re-occur (at least for a significant period of time). The flashover current may be brought under control relatively quickly and it may be possible then to simply operate the converter as normal. However, the fault controller may vary the conditions required for declaring a fault if a previous fault or defined number of faults have occurred in a certain time window and/or some alarm(s) may be generated if faults occur repeatedly.

In some embodiments the local controller for the director switch units may be configured, on detection of a fault current, to report the fault to the fault controller and maintain its semiconductor switching elements in a turned-on state but also to modulate the drive of the semiconductor switching element, e.g. to modify the gate to emitter voltage of the IGBT.

In some embodiments the gate-to-emitter voltage may be increased on detection of a fault current. This will have the effect of actually increasing the fault current. The increased fault current may however then be detected more quickly by the local controllers of the other semiconductor switching elements of the converter arm which will then react according to the strategy described above. This could therefore provide a quicker fault response as the fault controller may receive the required number of fault reports more quickly and/or the cells of the chain-link may more quickly automatically switch to the blocked state.

Alternatively, the gate voltage could be reduced with the aim of extending the survival time of the switching elements of the director switch, but opposing the fault current. Reducing the gate voltage in this way may however cause a relatively high voltage stress across the director switch as it aims to reduce the current levels, and may also limit the amount of cells of the chain-link that react directly to the fault current—rather than being ordered off by the fault controller.

Figure 5:
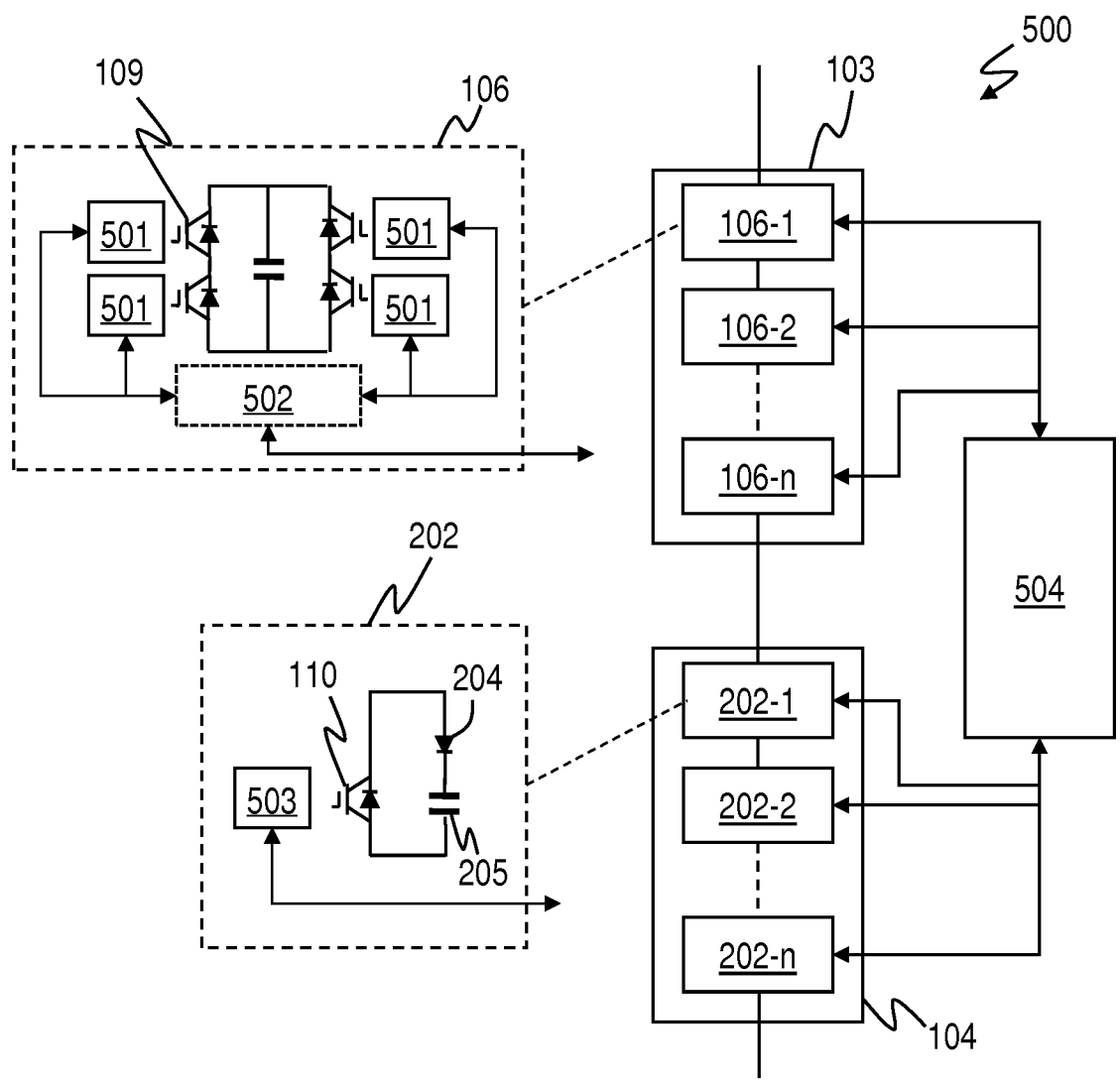
FIG. 5 illustrates a fault protection apparatus according to an embodiment.

FIG. 5 illustrates how a converter arm fault protection system 500, according to an embodiment, is implemented by a combination of local and higher-level controllers. FIG. 5 illustrates a converter arm having a chain-links 103 in series with a director switch 104. The chain-links comprises a series of cells 106-1 to 106-n, each cell comprising a plurality of switching elements 109 with anti-parallel diodes and a capacitor as described previously. Each cell switching element 109 may have a local cell switching element controller 501 for local fault protection and/or there may be a cell level controller 502. Note that the individual cell switching element controller 501 and/or cell controller 502 (if present) may be seen as a local controller associated with a cell switching element.

The director switch 104 comprises a series connection of director switch units 202-1 to 202-n, each comprising a switching element 110, with associated antiparallel diode and snubber diode 204 and snubber capacitor 205. Each director switch unit 202 also has a local director switch unit controller 503. Although not shown in FIG. 5 the director switch units 202 may, in some designs, be arranged in local groups, say of ten or so director units, with a group controller for control of the director switch units 202 of that group.

As described above, in the event that a local cell switching element controller 501 of a cell, say cell 106-1, detects a fault condition, it is configured to turn-off its associated switching element 109. The local cell switching element controller 501 may also communicate with the controllers of the other switching elements in the same cell to turn them off, possibly via a cell controller 502. The local control, whether switching element controller 501 or cell controller 502 also sends a fault report to a higher-level controller which is converter arm fault controller 504. The converter arm fault controller 504 will receive the fault report and, if it determines a fault has occurred, will communicate with at least some of the other cells 106-2 to 106-n to order them to turn-off all the switching elements. Initially the director switch is kept on but in some embodiments once the fault current is brought under control the converter arm fault controller 504 may signal the director switch units 202-1 to 202-n to turn-off.

However, in the event that a local director switch unit controller 503 detects a fault condition, it is configured to communicate with the converter arm fault controller 504 to signal the fault but to maintain its switching element 110 in the on state. The converter arm fault controller 504 will receive the fault report and, if it determines a fault has occurred, will communicate with at least some of the chain-link cells 106-1 to 106-n to order them to turn-off all the switching elements. Again, the director switch is kept on, at least initially, but in some embodiments once the fault current is brought under control the converter arm fault controller 504 may signal the director switch units 202-1 to 202-n to turn-off at the same time.

Figure 6:
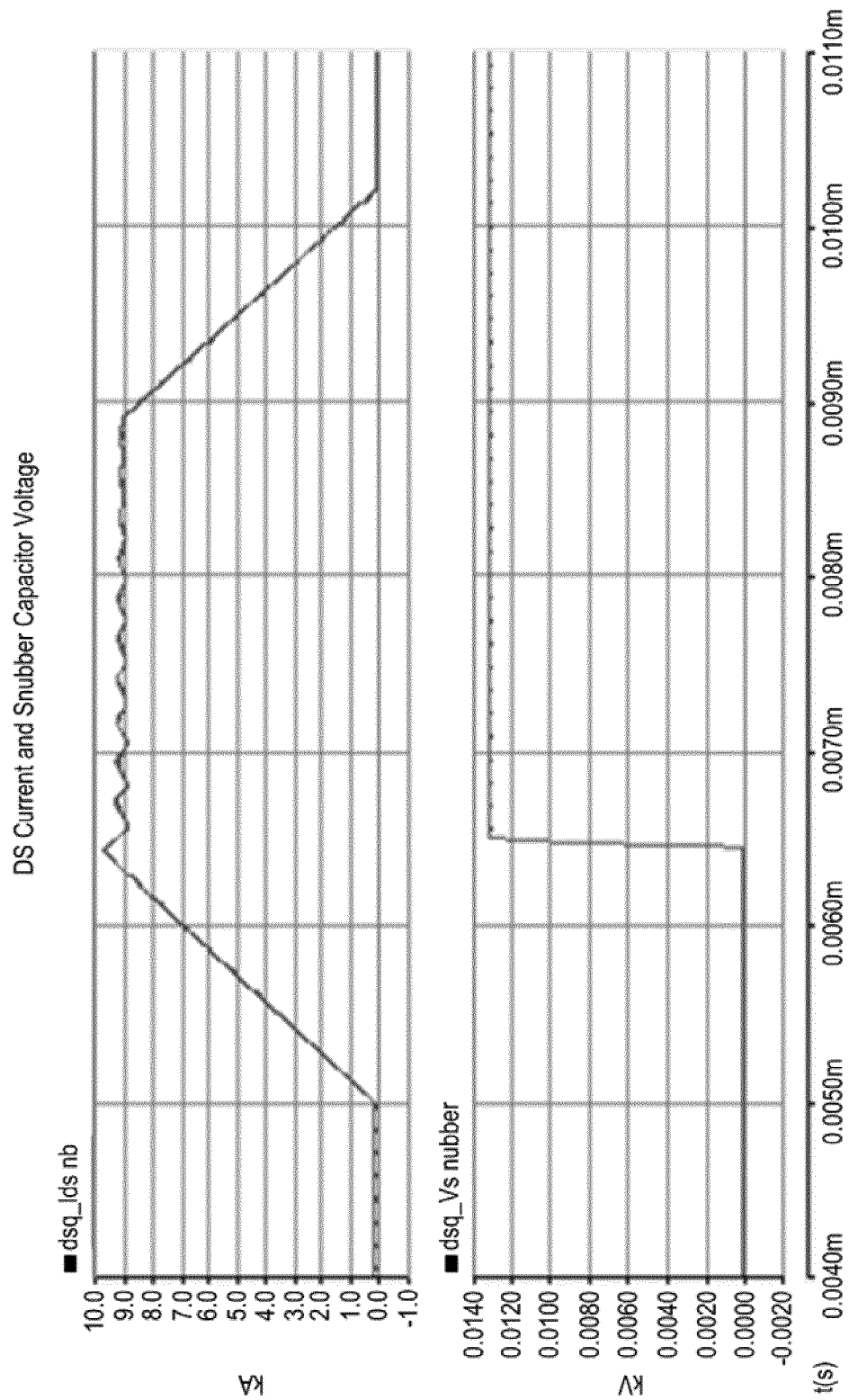
FIG. 6 illustrates waveforms for a simulated fault which is mitigated according to an embodiment.

FIG. 6 illustrates voltage and current waveforms during a simulated fault using a protection strategy according to an embodiment of the invention. The same general simulation parameters were used as were used for the simulation discussed above with reference to FIG. 3. The top plot of FIG. 6 shows the current through the director switch and the lower plot shows the voltage of the snubber capacitor. It can be seen that the current through the director switch ramps up but then is brought under control and reduced to zero by the action of the chain-link cells switching to the blocked state. It can also be seen that as the director switch remains on during this period that the voltage on the snubber capacitor of the director switch remains relatively low throughout and thus does not reach dangerous levels.

The embodiments described herein thus provide a technique for mitigating the effects of fault currents using a relatively simple coordination strategy. It will be appreciated that as the director switch elements remain turned on during the fault event these switching elements will have to be rated to withstand the expected fault current levels, however, this is likely to be much more achievable and less costly than providing a suitably rated surge arrestor.

The various embodiments have been described in respect of an AAC type converter but it will be appreciated that the techniques are applicable to any type of VSC comprising a director switch formed from director switch units having a switching element and also chain-link cells for wave shaping.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. An apparatus for a voltage source converter comprising:
   a chain-link circuit in series with a director switch; and
   a fault controller;
   wherein the chain-link circuit comprises a plurality of cells, each cell comprising an energy storage element and a plurality of cell switching elements connected with antiparallel diodes, the cell switching elements being configured such that the energy storage element can be selectively connected in series between terminals of the cell or bypassed;
   wherein each cell switching element has an associated cell switching element controller;
   wherein the director switch comprises a plurality of director switch units, each director switch unit comprising a director switching element and a director switch unit controller;
   wherein each cell switching element controller is configured to monitor for a fault current and, in the event a fault current is detected, to turn-off its associated cell switching element and report a fault event to the fault controller;
   wherein each director switch unit controller is configured to monitor for a fault current and, in the event a fault current is detected, to report a fault event to the fault controller and to keep its associated director switching element turned-on; and
   wherein the fault controller is configured to monitor for any reports of fault events to determine whether a fault is occurring and, in the event that a fault is occurring, to order all of the cell switching elements of at least some of the plurality of cells to turn-off.

2. An apparatus as claimed in claim 1, wherein each cell switching element controller is configured, in the event a fault current being detected, to turn-off all of the cell switching elements of that cell.

3. An apparatus as claimed in claim 1, wherein the fault controller is configured to determine that a fault is occurring if a predetermined number of fault reports are received within a predefined time window of a first fault report.

4. An apparatus as claimed in claim 1, wherein, in the event that a fault is occurring, the fault controller is configured to determine a location where the fault is occurring and determine which cells to turn off based on said identified location.

5. An apparatus as claimed in claim 1, wherein the fault controller is configured to, after ordering all of the cell switching elements of at least some of the plurality of cells to turn-off, subsequently order the director switch units to turn-off when a safe current level is reached.

6. An apparatus as claimed in claim 1, wherein at least one director switch unit controller is configured, in the event of detection of a fault current, to modulate the drive voltage applied to the associated switching element.

7. An apparatus as claimed in claim 6, wherein the modulation of the drive voltage comprises one of reducing the gate drive voltage or increasing the gate drive voltage.

8. A voltage source converter comprising at least one phase limb having two converter arms, each converter arm having an apparatus as claimed in claim 1.

9. A method of fault protection for a voltage source converter comprising a chain-link circuit in series with a director switch;
wherein the chain-link circuit comprises a plurality of cells, each cell comprising an energy storage element and a plurality of cell switching elements connected with antiparallel diodes, the cell switching elements being configured such that the energy storage element can be selectively connected in series between terminals of the cell or bypassed; and
wherein the director switch comprises a plurality of director switch units, each director switch unit comprising a director switching element;
the method comprising:
monitoring at each cell switching element for a fault current and, in the event a fault current is detected at a cell switching element, turning-off that cell switching element and reporting a fault event to a fault controller;
monitoring at each director switching element for a fault current and, in the event a fault current is detected, reporting a fault event to the fault controller and keeping that director switching element turned-on; and
monitoring at the fault controller for any reports of fault events to determine whether a fault is occurring and, in the event that a fault is occurring, ordering all of the cell switching elements of at least some of the plurality of cells to turn-off.

10. A method as claimed in claim 9, comprising, in the event a fault current is detected at a cell switching element, turning-off all of the cell switching elements of that cell without waiting for an order from the fault controller.

11. A method as claimed in claim 9, wherein the fault controller determines that a fault is occurring if a predetermined number of fault reports are received within a predefined time window of a first fault report.

12. A method as claimed in claim 9, wherein, in the event that a fault is occurring, the fault controller determines a location where the fault is occurring and determine which cells to turn off based on said identified location.

13. A method as claimed in claim 9, wherein, after ordering all of the cell switching elements of at least some of the plurality of cells to turn-off, the fault controller subsequently orders the director switch units to turn-off when a safe current level is reached.

14. A method as claimed in claim 9, comprising, in the event of detection of a fault current at a director switching element, modulating the drive voltage applied to the director switching element.

15. A method as claimed in claim 14, wherein modulating the drive voltage comprises one of reducing the gate drive voltage or increasing the gate drive voltage.

* * * * *